United States Patent Office 3,507,188
Patented Apr. 21, 1970

3,507,188
WORKTABLE SUPPORTING AN INDEPENDENT
LARGER TABLE FOR ROTATION AND LINEAR
TRANSLATION THEREOF
Charles William Berthiez, 5 Avenue Eglantine,
Lausanne, Switzerland
Filed July 2, 1968, Ser. No. 742,013
Claims priority, application France, July 11, 1967,
113,858
Int. Cl. B23d 7/08
U.S. Cl. 90—58                     10 Claims

ABSTRACT OF THE DISCLOSURE

A workpiece supporting table arrangement for a machine tool in which the table arrangement comprises two independent tables of different sizes (that is a large table and a small table) with the large table disposed above the small table. A mechanism is provided for moving the large table relative to the machine tool and means is also provided for effecting rotation of the large table through the intermediary of the small table.

The present invention relates to the machining of workpieces of substantial dimensions in a plane, and it is particularly concerned with the case in which such workpieces must rapidly alternate with workpieces of lesser size for machining purposes.

When workpieces of substantial dimensions in a plane are subjected to the operations of turning, circular milling or operations requiring indexing, these workpieces are generally secured to a table movable relative to a machine tool, and adapted to be rotated on a circular slide.

Generally, such tables are dimensioned to suit the size of the workpieces to be machined, that is to say there exists a relationship established by experience between the diameter of the slide and the maximum diameter of the workpieces to be admitted on to the table, as well as a relationship between the cutting power and the size of these workpieces, assuming large-diameter workpieces to be very heavy and call for large machining allowances necessitating substantial cutting power.

Thus, when it is desired to machine workpieces of large diameter but of relatively reduced weight, such as rings for example, it has been necessary to use up till now a large-diameter platform, whereof the weight and power requirements are generally excessive.

Such platforms are very expensive, and necessitate considerable foundation work. They are consequently not desirable in the present case. Moreover, if they solve, in an excessive manner, the problem of machining large diameter workpieces they lend themselves poorly to the machining of workpieces of small diameter which requires high rotary turning speeds which are not present in platforms of such a size. Thus, to avoid excessive overhanging of tool holders for machining small workpieces, it is necessary to employ boring and turning mills with two uprights and cross rail, whereof the weight and cost are substantial.

Different solutions have been proposed to remedy the abovementioned drawbacks.

Platforms are known for example having two concentric turning surfaces provided with different speeds inversely proportional to their diameter. However these platform are as costly and as complex as their predecessors notably due to the necessity of using a boring and turning mill with two uprights and cross rail.

The solution usually employed till now to resolve the problem posed by the machining of large diameter, relatively low-weight, workpieces consists in placing on a small platform, a large movable platform provided with arms forming a star. The problem of machining workpieces of restricted diameter at convenient speeds and with a minimum overhang of tool is solved, but the manipulations of such a platform are extremely long and delicate considering its bulk. Further, once in place this platform rests on the circular slide of the small platform which is injurious to the stable rotation of the large platform and the workpiece, and thus the ultimate precision of the machining.

The present invention proposes to overcome all these drawbacks by providing a rotatable table arrangement for supporting workpieces to be machined which allows machining of substantially dimensioned workpieces and reduction of the non-operational time of the machine tool.

Another object of the invention is to provide a rotatable table arrangement which permits easy and rapid presentation of very differently dimensioned workpieces to the machine tool.

Another object of the invention is to provide a rotatable platform arrangement for supporting workpieces to be machined of substantially differing sizes which ensures high precision machining whatever their size.

Another object of the present invention is to permit machining of workpieces of very large diameter but relatively lightweight for their size in rational and economic conditions, without adversely affecting precision of machining.

Thus, another object of the invention is to provide an arrangement for supporting workpieces to be machined which can be realised in a simple manner.

According to the present invention, therefore, the present invention is a table arrangement for supporting work pieces on a machine tool comprising two parallel independent tables of different dimensions with the larger of the two tables above the smaller table, means for advancing the large table relative to the machine tool, and means for effecting rotation of the large table by the small table.

The small table is preferably mounted under the large table for movement relative to the machine tool, and both tables comprise means for centering and coupling together to maintain their axes in precise co-incidence.

The means for advancing the large table relative to the machine tool is preferably constituted by the small table.

Means is preferably provided for adjustably supporting the large table at the centre of the small table.

The large table is preferably rotatably mounted on a seat movable in a direction parallel to that of the small table, and the axes of rotation of both tables are maintained constantly in the same plane.

It will be manifest from the above, that the support arrangement will permit considerably improved conditions for machining workpieces of substantial dimensions in a plane, and this, partcularly, when it is desired to retain the possibility of using the same machine tool for workpieces of smaller size.

The arrangement is, in effect, such that one can, if desired, rapidly bring the small or the large table adjacent the machine tool, which permits reduction to the minimum of the overhang of the tool with a machine whose framework includes a vertical pillar which may form the workpiece. The superimposed disposition of the two tables allows reduction of the overall bulk of the arrangement.

The provision of the second table of substantial dimensions mounted permanently in combination with a known small platform permits, in addition to increasing the versatility of use of the machine which is obvious, improvement of the output by optimum employment of the working time; the equipping and preparation of the large table, with a view to machining a workpiece of substantial dimensions, can be carried out without any interruption of the working of the machine on a workpiece of lesser size supported on the small table.

Further, tedious manipulations of the large table are eliminated, and its movement to the machining position is rapid and simple once the workpiece on the small table which has just been finished is removed.

Thus, the present invention results in a remarkable increase in the versatility of use and output in machining installations by the simple use of two tables which eliminates non-productive manoeuvres.

In addition, the mounting of the large table on a seat independent of and larger than that of the small table is a factor giving precision of operation since this seat ensures excellent stability of the large table.

However, when the workpieces of substantial dimensions are relatively lightweight for their use, which is the case for example with rings, it is pointless to provide the large table with considerable cutting power, and it is then very advantageous to effect movement of the large table by the small table, which permits the rational employment of power, speed and mobility.

This solution is to be recommended due to its simplicity, the large table only intervening in the machining by its geometrical qualities of order. The centering of this movement by the coupling of these platforms constitutes an additional factor of simplicity of the arrangement.

The advancement of the machining operations by passage of one table relative to the other is effected very rapidly; the small table provided with means for effecting rectilinear and rotatable displacements for circular machining or indexing is adapted to be disposed under the large table. The latter can then be centred and coupled to the small table which then advances towards the working position in which it is locked against rotation. Due to the rotary coupling means the small table transmits to the large table movements resulting from circular machining or indexing of a workpiece. Once the machining is finished, the large table is removed from the machine (always with the assistance of the small table) to bring it to a position of maximum withdrawal where the two tables are disconnected. The small table only can be presented under the machine tool without in any way being overlapped by the large table when the latter occupies its position of maximum withdrawal.

The adaptabiliiy of the support arrangement, according to the invention, is further increased by the possibility of enlarging the large table by fixing to it in star disposition radial arms of dimensions determined by the workpieces to be supported. The equipping of the large table with these arms is effected when it is in the position of maximum withdrawal.

An arrangement is also provided which ensures that any increase in the weight of the large table caused by these arms is supported on the pivot of the small table. Due to this arrangement, the power required to rotate the large table is considerably reduced. In effect, the additional weight on the centre of the small table, is supported by a small-diameter bearing, and the circular seat on which the large table rolls is thus relatively loaded. This seat serves essentially to absorb the vertical component forces to which the large table is subjected, and thus serves to stabilise the support arrangement when the cutting operations are being effected.

Thus, the mounting of the seat of the large table on retractable wheels permits, when it is moved to the working position, lowering of same on to plates on which it can be fastened to reinforce the action of its weight in avoiding any displacement due to cutting forces.

An embodiment of the present invention will now be described, by way of example, with reference to the accompanying drawings, in which.

Referring to FIGS. 1 to 4 there is illustrated generally the different parts of the support arrangement described in the following example. In this instance, the machine tool is a milling and boring machine 1 of the kind mounted for transverse movement on a bench 2 and which is provided with a turning tool carrier 3.

The supporting table arrangement 4 for the workpieces to be machined in this machine is constituted by two superimposed horizontal tables 5 and 6, of different sizes, the smaller table 5 being disposed under the larger table 6. The small table 5 is mounted in a pit 7 excavated in a longitudinal direction perpendicular to the bench of the milling and boring machine 1, and the large table 6 is movable over this pit 7 in the same direction, the axes of the two tables being constantly in the same vertical plane.

The small table 5 comprises a slotted bed 8 rotatably mounted on a seat 9 which is movable along the bottom of the pit 7 on a bench 10 protected by guard slides 11 and 12. The top face of the table 5 is flush with ground level.

Along the side of the pit 7 are provided plates 13 provided with T-slots 14 supported on beams 15 extending longitudinally along the pit. Linear roller tracks 16 are disposed on the plates 13 from one end of the pit 7 to the other.

The large table 6 is essentially a polygonal bed 17 of large dimensions relative to the bed 8 of the small table and has T-slots 18 on its upper face. Arms 19 (FIG. 3) can be secured to the polygonal bed 17, the length of the arms 19 being determined by the size of the workpieces. These arms are, in this embodiment, screwed on to the polygonal bed 17. The upper face of each arm 19 is provided with T-slots 20 aligned with the slots 18 of the bed 17. The ends of the arms 19 are interconnected by struts 22 so as to close the periphery of the star thus formed by the assembly of the polygonal bed 17 and the arms 19 and to act as a guard against accidents.

The polygonal bed 17 rests on a seat 24 of a shape and diameter almost equal to that of the bed 17, and this seat 24 is constituted by an extremely rigid metallic casing empty at its middle and which supports at its periphery a series of wheels 25 on which rests a circular roller track 26 disposed on the underside of the polygonal bed at its periphery. The seat 24 is itself movable relative to the machine tool 1 due to the provision of four wheels 27 running in the roller track 16. These wheels 27 are adapted to be retracted into the interior of the seat 24 so as to allow the seat to rest on the plates 13 through the intermediary of four support surfaces, ecah consisting of three plates 29 surrounding each of the wheels 27.

At the centre of the large table 6 is located a bolt 30 whereof the lower end is adapted to engage in a corresponding bore 31 in the centre of the small table 5. This bolt has essentially three functions; firstly it forms the centre axis of the two tables 5 and 6 so as to permit the transmission of rotary movement from the small table to the large table; secondly it couples the table 5 to the table 6 when the former is displaced along the pit 7, the bolt 30 entraining with it the table 6 by linearly displacing the roller track 26; thirdly it transfers certain loads from the large table to the centre of the small table so as to relieve as much as possible the rolling surfaces 25 and 26 of the table 6 and its seat respectively.

As previously stated there is fixed to the polygonal bed 17 arms 19 of different lengths dependent on the size of the workpieces. In the present instance, two lengths of arm 19 are provided, one forming a star of small diameter, and the other forming a star of substantial diameter and adapted to receive the largest known workpieces. The bolt 30 is provided with a device that permits, in each of these two cases, transfer of the weight of the arms forming the star to the centre of the small table, a system of rods 32 ensures, thanks to a mechanism which will be explained later that excess loading of the polygonal bed 17 due to the addition of the arms 19 is effectively transferred to the small table 5.

The large table 6 has, at its lower part, a plough-shaped structure 33 adapted to engage a mounting 34 fixed to the periphery of the bed 8, and permitting the small table 5 to rotate the large table 6 when their axes are maintained firmly co-incident by the bolt 30.

The different parts of the apparatus in accordance with the present invention having been described, it is now necessary to describe the details of the support arrangement being given that the milling and boring machine 1 is of known kind and that the small table is also of conventional construction, and comprises, besides the means of longitudinal displacement along the bottom of the pit 7 on the bench 10, rotating means for the operations of circular machining and indexing of the workpieces.

Figure 7:
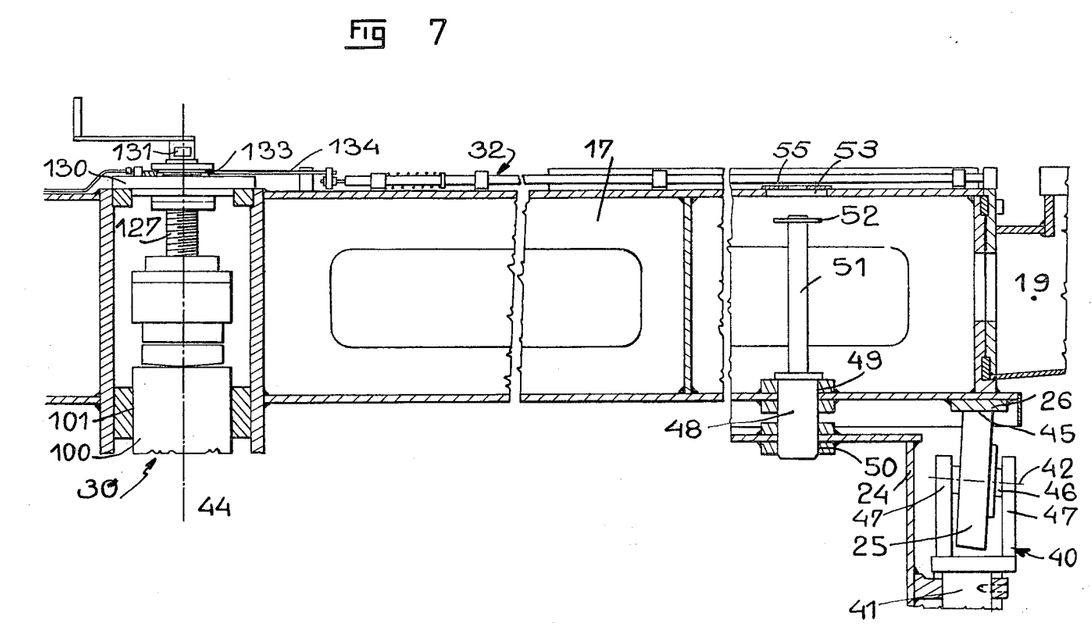
FIG. 7 is a sectional view on the diametcal plane of the upper table showing details of construction.

Referring to FIG. 7 there is shown the roller track 26, which is is constituted by a steel circular strip on the lower surface of the polygonal bed 17, but which does not ensure centering of the latter relative to the seat 24. The wheels 25 are not guided.

These wheels 25 are distributed regularly around the periphery of the seat 24 and are each mounted in a fork 40, whereof the stem 41 is centred in a corresponding bore of the seat.

The wheels 25 are of frusto-conical form so that their axes of rotation 42 intersects the axis of rotation 44 of the large table in the plane of the roller track 26. This arrangement avoids any relative sliding between the roller track 26 and the rim 45 of the wheel 25 when the polygonal bed 17 rolls on its seat 24 around its axis 44.

The wheels 25 are mounted on an axle 46 inclined to the horizontal between the arms 47 of the fork 40 and centred in the bores provided. The exact positioning of the wheels 25 heightwise and radially is effected by shims.

FIGURE 7 shows that the table 6 is provided with a screw 48 to lock the bed 17 against rotation on its seat. This screw is adjusted in a bore 49 in the lower plate of the table, and it is adapted to screw engage in a bore 50 corresponding to the upper part of the casing forming the seat 24. It is provided with a shank 51 and a handwheel 52. An opening 53 is provided in the upper plate of the bed 17 closed by a two-part cover 55 and permits, after opening of the cover 55, access to the screw and raising of the handwheel 52 through the opening 53. The two parts of the cover are then engaged around the shank 51 which prevents descent of the handwheel 52 and of the shank to their original positions so maintaining the screw disengaged from the bore 50. In this position, the table is free to rotate on its seat 24.

Figure 6:
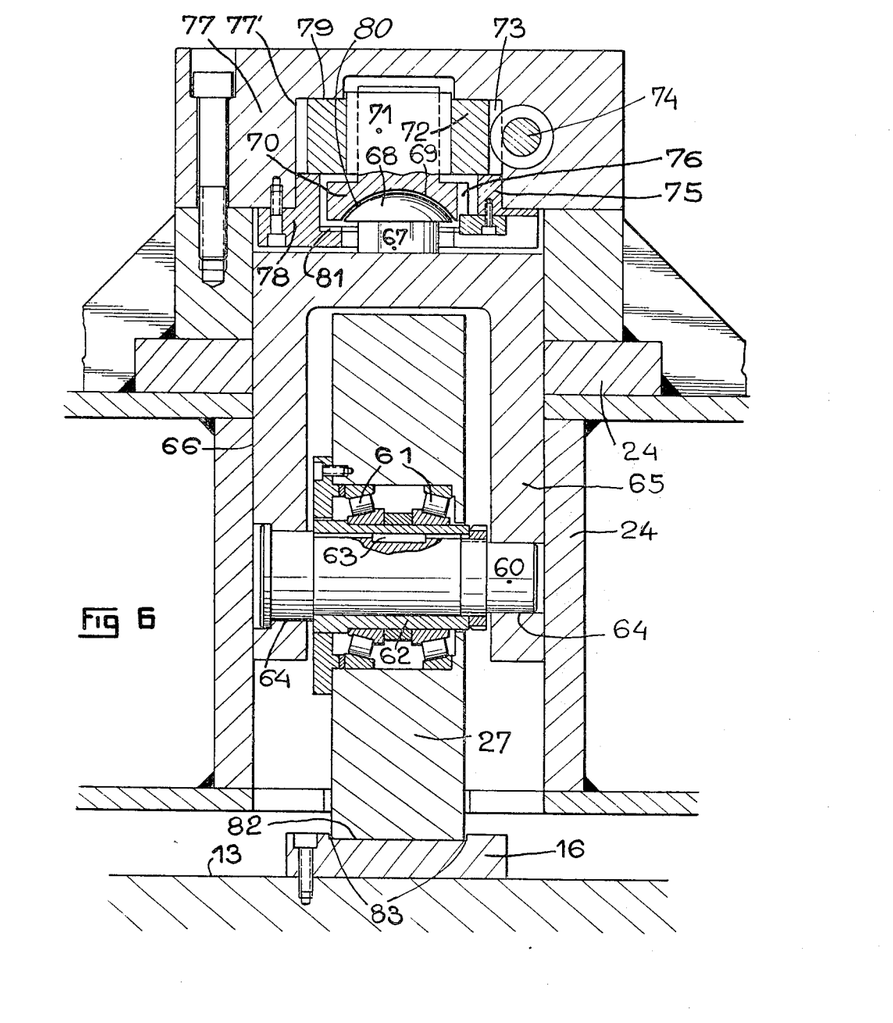
FIG. 6 is a sectional view on a plane passing through the axis of a travelling wheel for the seat of the upper table.

FIGURE 6 shows the mounting of four wheels 27 of the seat 24 of the large table 6 on the roller track 16 which extends along the pit 7.

The wheels 27 are mounted on an axle 60 through the intermediary of conical rollers 61 supported on a sleeve 62 keyed at 63 to the axle 60.

The axle 60 is centered in bores 64 of a vertical fork 65 externally cylindrical and fitted precisely in a bore 66 provided in the seat and in which it can slide.

The fork 65 terminates at its top in a projection having a convex spherical extremity 68 adapted to support a correspondingly shaped concave bearing 69 in the enlarged lower part 70 of a screw jack 71. The shank of the screw jack 71 is threaded and engages a nut 72 having at its periphery helical teeth 73 meshing with an endless screw 74, whose axis is perpendicular to the axis of the screw jack shank. The end of the endless screw 74 is squared (not shown) and due to this it can be caused to rotate.

The screw jack 71 is locked against rotation by a key 75 integral with the seat 24 by engagement of the key in a lateral slot 76 at the lower part 70 of the screw jack 71. The nut 72 is located in a cylindrical chamber 77' of a casing 77 screwed to the seat 24 and closed at its lower part by a washer 78 screwed to the casing 77. The seat 24 is adapted to be supported on the nut 72 by contact of the casing 77 with same at the upper part 79 of the cylindrical chamber 77' of the casing.

Figure 3:
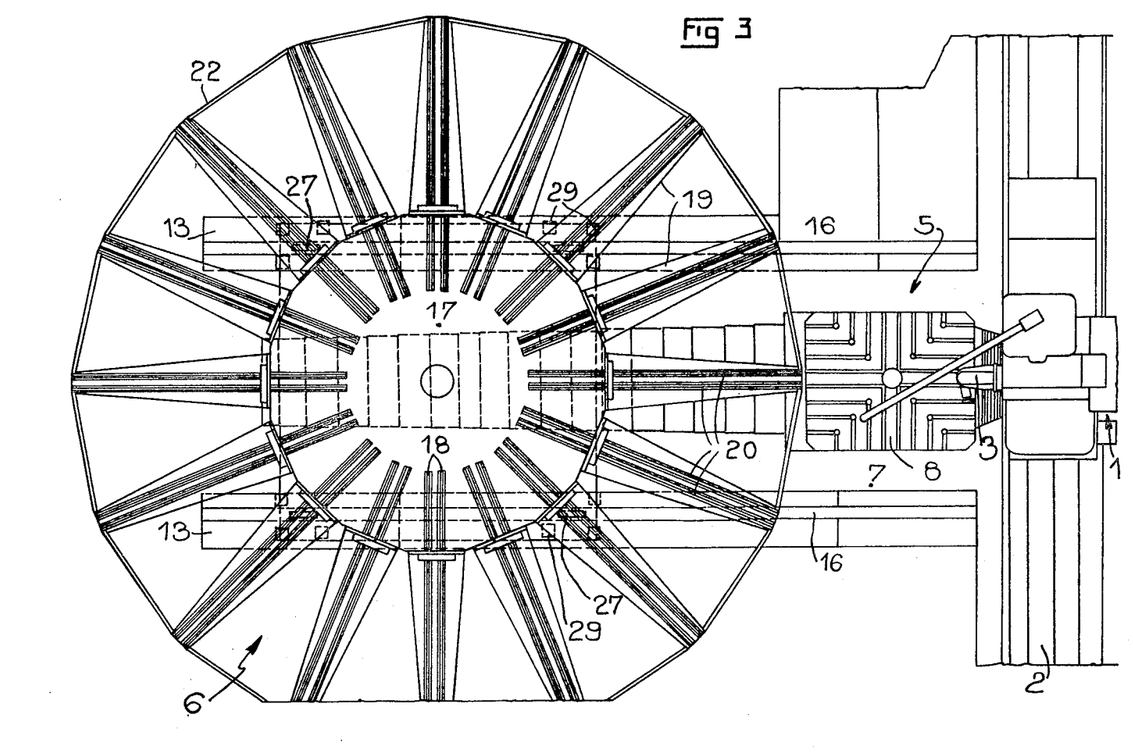
FIG. 3 is a plan view of the support arrangement and the machine tool wherein the tables are disconnected.

In the position shown in FIG. 6, the wheel is retracted under the seat 24, that is to say the latter rests all its weight on the plates 13 through the intermediary of the support plates 29 (FIGURE 3). The wheel 27 mounted in its fork 65 slidable in the bore 66 rests on the roller track 16 but does not support the seat 24 as there is a degree of play 80 between the spherical head 68 of the projection of the fork 67 and the bearing 69 of the screw jack 71.

The action of rotating the endless screw 74 by its squared end (not shown) in the necessary direction causes rotation of the nut 72 and the downward axial displacement of the screw jack 71 locked against rotation. When the bearing 67 contacts the spherical head 68, the weight of the seat is transmitted to the wheel 27 and to the roller track 16 through the intermediary of the casing 77, the nut 72, the screw jack 71 and the fork 65.

An identical action for all four wheels 27 permits entire support thereon of the weight of the seat 24, and consequently of the polygonal bed 17. The large table 6 is then ready to be displaced over the pit 7.

The upward and downward vertical movement of the screw jack 71 is limited by the abutment of the enlarged head 70 with the bottom of the nut, on the one hand, and by the abutment of the enlarged head 70 with a joggle 81 of the washer 78, on the other hand.

Scrapers (not shown) are fixed to the seat 24 interspersed with the wheels 27 to sweep the roller tracks 16 before passage of the wheels thereover to avoid deterioration of same by their contact with turnings or other waste. It is to be noted that the wheels 27 are not positively guided laterally in the groove 82 of the roller track due to the play indicated at 83.

Figure 5:
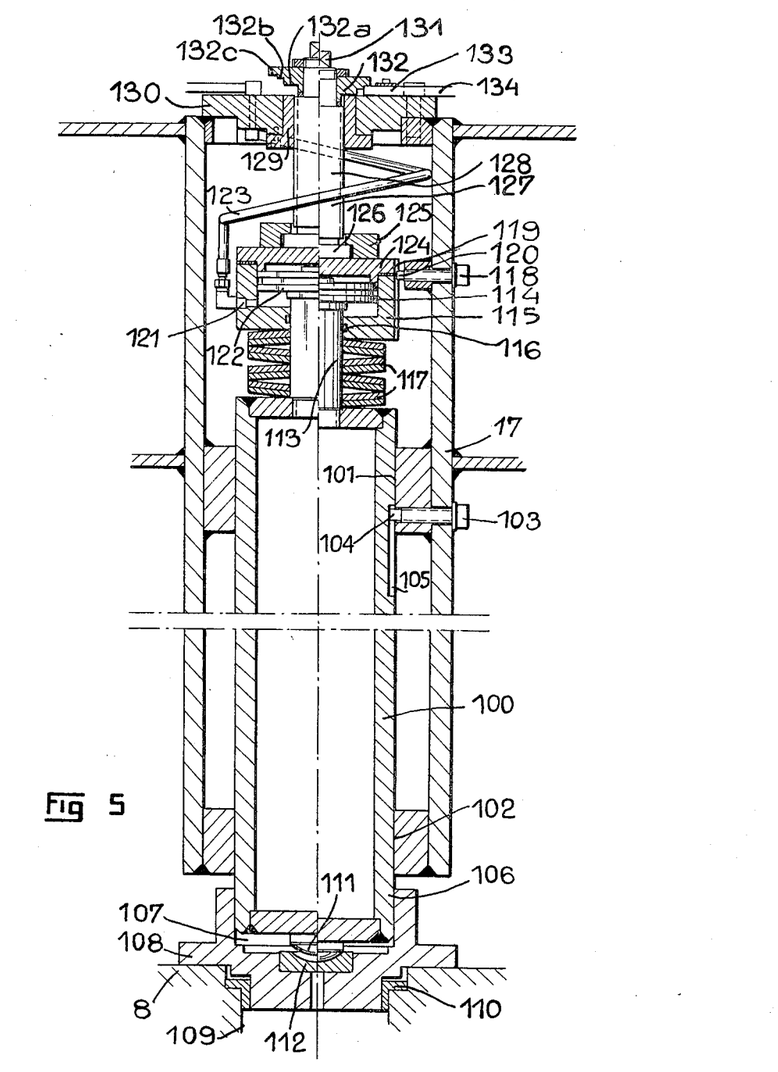
FIG. 5 is a sectional view of a bolt in two distinct positions and which serves to couple the upper table to the lower table.

The bolt 30 is shown in detail in FIGURE 5. This bolt is integral with the polygonal bed 17 and is located at the centre and axis thereof. The bolt has three essential functions as described above to permit realisation of the invention. This bolt 30 consists of a very rigid metal cylinder 100 slidingly mounted with positive adjustment in two bores 101 and 102 formed in the metallic casing of the polygonal bed 17. A screw 103 fixed in this casing is engageable at its inner end 104 in a groove 105 of the cylinder 100 to prevent rotation thereof relative to the table 17.

The lower end of the cylinder 100 is adapted to be located, as shown in FIGURE 5, in a bore 107 in a bearing member 108 secured to the bed 8 of the small platform 5.

This member 108 is accurately centred in a bore 109 of the bed 8 through the intermediary of a socket 110.

The lower end 106 of the cylinder 100 has a convex spherical support member 112 force fitted at the bottom of the bearing 108.

In the upper end of the cylinder 100 there is screwed a rod 113 carrying at its top a piston 114. This piston is slidingly mounted in a cylinder 115 in which the rod 113 can be displaced in a fluid-tight manner due to a seal 116. The cylinder 115 is secured at its lower part in the upper end of cylinder 100 by two resilient rings 117 in opposed pairs forming a powerful spring. A screw 118 fixed to the bed 17 prevents rotation of the cylinder while allowing free axial displacement due to a longitudinal groove 119 at the periphery of the cylinder in which engages the end 120 of the screw 118.

The cylinder 115 has at its base an inlet 121 for oil under pressure adapted to act on the lower face 122 of the piston 114 and thus to urge movement of the cylinders 100 and 115 towards each other by compressing the resilient rings 117. The delivery of the oil 121 is effected from a reservoir by an oil pump (not shown) integral with the bed 17 via a flexible pipe 117.

The cylinder 115 is closed by a cap 124 surmounted by a small bearing 125 in which is located a flange 126 at the base of a rod 127 disposed at the axis of the bolt 30 and having trapezoidal threading.

The flange 126 is free to rotate relative to the cover 124 which is secured against rotation by the screw 118, and the threaded rod 127 is engaged in a corresponding threaded bore of a collar 129 fixed to a cap 130 rigidly secured to the polygonal bed 17. A squared end 131 at the top of the threaded rod 127 allows the latter to be rotated so that it is screwed into or out of the threaded collar 129 and thus through the intermediary of the flange 126 to raise or lower the cylinder assembly 115, rod 113 and cylinder 100 relative to the centring bearing 108 integral with the small table 5. Thus, when the two tables 5 and 6 are superimposed it is possible by lowering the bolt 30 as is shown above, to firmly secure the two tables in two coaxial positions. It is sufficient that the lower end 106 of the cylinder 100 is engaged in the bearing 108 at the centre of the small table. Thus, the centering of the two tables can be effected so that there is a transmission between the two tables 5 and 6 of forces parallel of the planes of these tables. In the absence of loading on the polygonal bed 17 caused by the presence of the arms 19 there is no transmission of vertical forces between the two tables. When it is desired to support on the small table 5 part of the load of the polygonal bed 17, pressurised oil is fed through the port 121 into the cylinder 115. This has the effect of raising the piston 114 relative to the cylinder 115 and consequently the cylinder 100 against the resilient rings 117 which are thus compressed by a certain force F. If it is assumed that before the oil arrives the two tables were bolted together, that is to say, the upper bearing 111 was in contact with the complementary member 112 corresponding to the base of the bearing 108, the raising of the piston 114 has the effect of raising over an equivalent distance the bearing 111 above the complementary member 112. One can thus lower the bolt assembly 30 by manipulation of the threaded rod 127 with the aid of the squared end 121 until this contact is re-established between the spherical surfaces 111 and 112.

At this instant, if delivery of oil pressure in the cylinder 115 is supressed the resilient rings 117, which are compressed, tend to apply to the spherical members 111 and 112 (one against the other) a force F equal to the force of compression and by reaction relief of an equivalent amount of the load applied by the polygonal bed 17 to the seat 124 is attained. Indeed the rings 117 apply a force F directed upwardly to the cylinder 115, which force transmitted to the polygonal bed 17 through the intermediary of the threaded rod 127 and the cap 130.

As has already been explained one can utilise the previously described arrangement for transferring the load so that there is supported on the small table 5 the weight of the arms 19 permitting extension of the polygonal table 17 and forming a star.

In the present example, where one utilises two forms of arms to form a star of lesser size and a star of larger size, the rings 117 can be in three distinct conditions, noncompressed, medianly compressed and fully compressed which gives three positions of height to the squared end 131 relative to the upper face of the cap 130.

These three positions can be easily indicated with the aid of a stepped collar 132 directed towards the base and located just below the squared end 131 due to which one can indicate visually that the excess loading of the table 17, due to the presence of the particular forms of arms employed is effectively transferred to the centre of the small platform.

Thus, the end of a bar 134 of the rod system 32 is adapted to be engaged between the top of cap 130 and one of the steps 132a, 132b or 132c of the collar 132.

It can be engaged under the lowest step 132a when the resilient rings 117 are not loaded, under the intermediate step 132b when they are medianly compressed, and under the top step 132c when they are fully compressed.

The radial position of the end 133 of the bar 134 is controlled by the intermediary of a radial push button (not shown in detail) of the rod system 32 and which is itself subjected to the action of abutments fixed to the arms 19 and in different positions for each of the two kind of arms. Depending on the radial position of the end 133 of the bar 134, the sleeve 132 can be lowered more or less thus ensuring that the kind of arm 19 employed on the polygonal bed and the loading on the resilient rings 117 correspond. This visual control of the arm kind and loading may be provided with or replaced by an electric switch mechanism for example.

The bolt 30 which permits movement of the large table 6 by the small table 5 and the centering of these two tables is provided with the plough-shaped structure 33 for rotational purposes, which structure extends downwardly from the lower face of the polygonal bed 17.

This structure 33 is constituted by a metallic triangular framework is movable relative to the bolt 30 and can rotate with the bed 17 in the interior of the seat 24. It has a rectangular sectioned end 141 adapted to cooperate with a drive member 142 secured to the periphery of the bed 8 of the small table 5.

Figure 4:
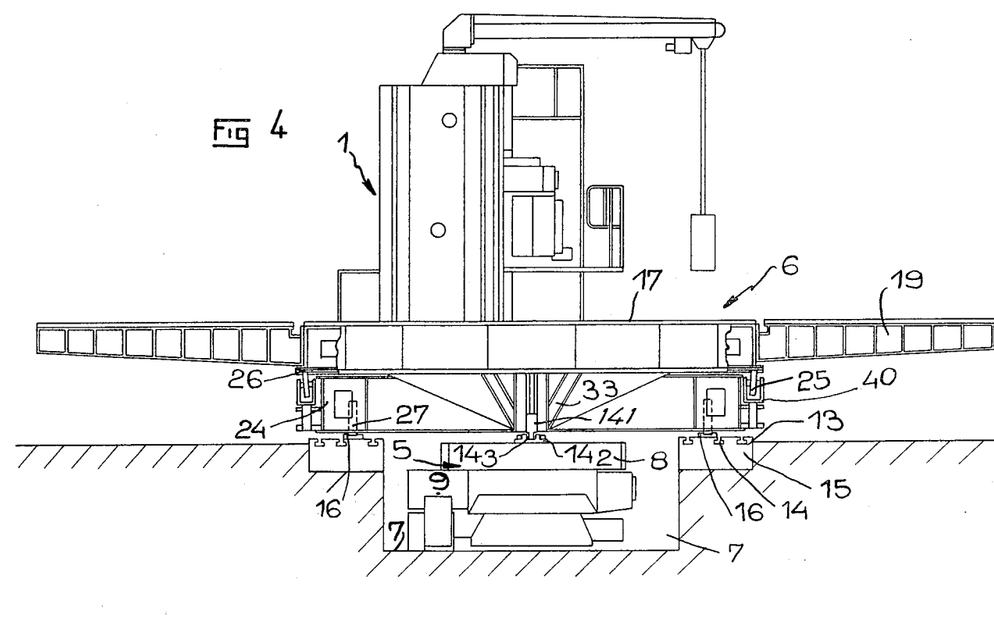
FIG. 4 is a partially sectioned, end elevation from the left of the support arrangement with the tables coupled together.

This drive member 142 comprises a slot 143 shown in FIGURE 4 into which can be fitted the end 141 of the structure 33. Lateral locking screws for the end 141 are provided in the slot 143 but are not shown.

The rotation of the small table 5 causes rotation of the structure 33 by which means the large table is rotated about the common axis of both tables.

The large table assembly 6 has been described in detail as has its function, and an explanation of the method of operation of the supporting table arrangement in accordance with the present invention will now be given.

With the assembly of the two tables 5 and 6, it is necessary to locate the large table 6 transversely relative to the small table 5 so that locking can be effected. The large table 6 is not precisely located by the roller tracks. To effect this location and locking, the small table is firstly disposed on its base structure at the bottom of the pit 7. The large table 6 is suspended from a movable bridge and the adjustment of the bolt 30 by the threaded rod 127 can proceed. The downward movement of the cylinder 100 is limited by the abutment of the step 132a of the stepped collar 132 with the end 133 of the bar 134. The latter is maintained in this position by a retractatble abutment (not shown) located at the periphery of the bed 17 opposite the end of a radial sleeve of the rod system 32.

The large table 6 is allowed to descend on to the small table 5 so that the lower end 106 of the cylinder 100 is centred in the bearing 108 of the small table 5 and the four wheels 27 for moving the seat make contact the two liner roller tracks 16. The drive member 142 on the bed 8 of the small table 5 is then in engagement with the structure 33.

Figure 1:
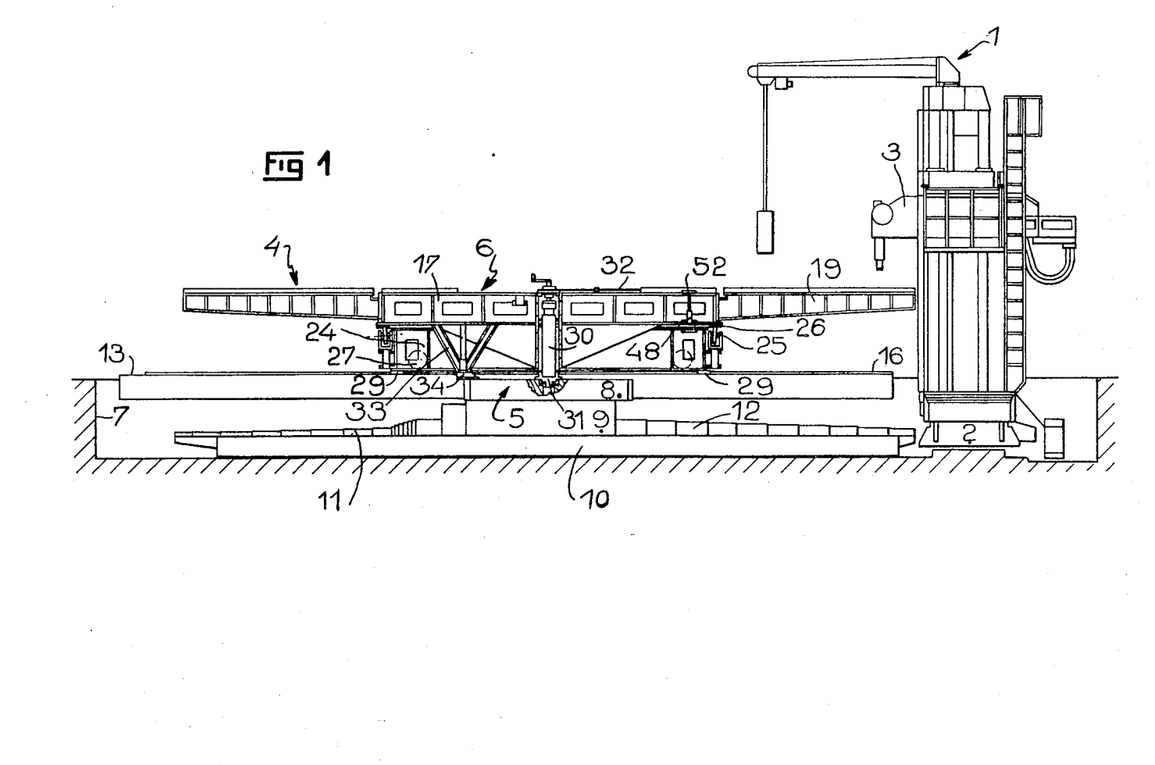
FIG. 1 is an elevation of a machine tool and workpiece supporting arrangement showing two interconnected tables.

In this condition, the large table 6 not provided with arms 19 is adapted to be rotated and moved by the small table 5 to which it is coupled. It can be disposed in a machining position under the machine tool 1 as shown in FIGURE 1.

Before commencing machining, the seat 24 is lowered on to the plates 13 by retracting the wheels 27 with the aid of the screw jack 71 operated by the endless screw 74 and it is maintained stationary in this position.

The large table 6 can equally well be disposed in its position of maximum withdrawal relative to the machine tool 1 at the other end of the pit 7 by moving the small table 5 over the bench slides 10. This positioning is precisely controlled by a switch (not shown) operated at a predetermined time to cause automatic stoppage of movement of the small table 5.

Figure 2:
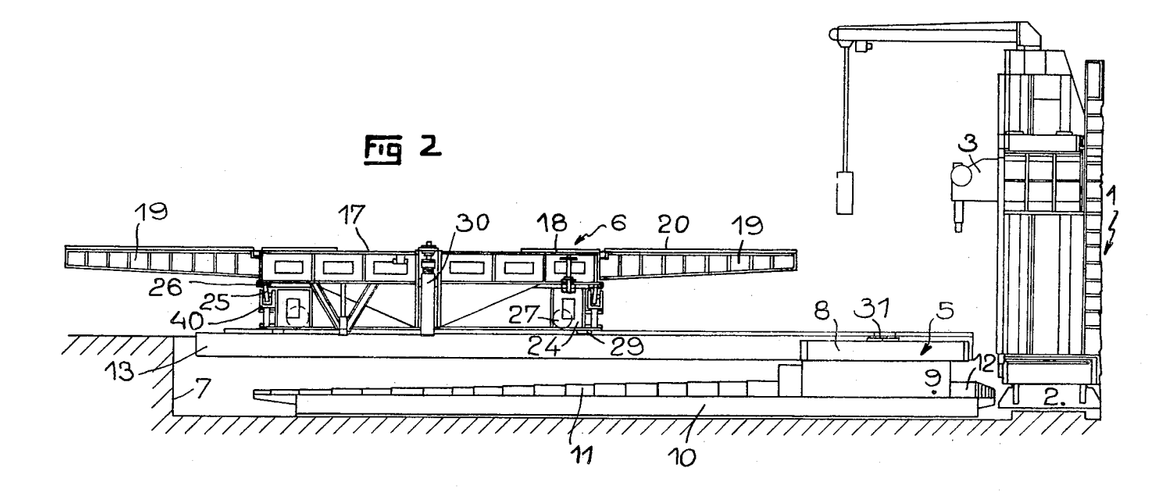
FIG. 2 is an elevation similar to FIG. 1 in which the two supporting tables are disconnected.

In this position, before disconnecting the tables 5 and 6, it is possible to support the large table 6 directly on the plates 13 and to maintain its stationary as aforesaid. The disconnection of the tables can then proceed and the small table 5 can be moved alone to any desired position and in particular into the position which allows it to be used in machining. This disposition is shown in FIGURES 2 and 3.

The large table 6 during this time can be fitted with the arms 19 to form a large-dimensioned star, and then a workpiece to be machined can be located on this table without interfering in any way with the use of the small table.

The transverse location of the large table is made only once and need only be made once, and the tables 5 and 6 can be coupled together again by moving the small table back along the pit 7 from the machine tool and it is automatically stopped due to the aforesaid switch in the desired longitudinal position below the large table 6. In this position the bolt 30 is lowered to engage and centre precisely in the bearing 108.

If the large table is fitted with arms 19, the weight of these arms is transferred to the small table by delivering pressure fluid into the cylinder 115 as previously disclosed, the rod system 32 and the stepped collar 132 visual indicating and verifying this transfer of load.

The above described supporting table arrangement attains the desired objects mentioned herein, that is to say there is provided a support arrangement which solves in a satisfactory and economical manner the requirements for machining large workpieces.

It will be manifest that various modifications may be made to the above described supporting table arrangement without departing from the scope of the present invention as defined in the accompanying claims.

What is claimed is:

1. A table arrangement for supporting workpieces on a machine tool comprising two parallel independent tables of different dimensions with the larger of the two tables above the smaller table, means for supporting said large table independently of said small table, means for advancing the large table relative to the machine tool, means for effecting rotation of the large table about its center by rotation of the small table about its center the two tables being interconnectable at their centers by centering and coupling means for maintaining their axes of rotation co-axial, and said small table supporting the entire weight of the large table in this relationship.

2. An arrangement according to claim 1, in which the small table is movable relative to the machine tool.

3. An arrangement according to claim 2, in which the means for advancing the large table relative to the machine tool is constituted by the small table being coupled to said large table.

4. An arrangement according to claim 1, comprising weight transmitting means for controllably supporting the weight of the large table on the centre of the small table.

5. An arrangement according to claim 1, in which the large table is rotatably mounted on a seat which is itself movable in a direction parallel to that of the small table, the axes of rotation of the two tables being parallel, and means providing that said axes remain at all times in the same plane when said tables are moved relative to each other.

6. An arrangement according to claim 1, in which the means for centring and coupling the two tables comprises a bolt axially movable in the large table, a corresponding axial bearing in the small table to receive said bolt, and a plough-shaped structure connected to the large table having an end received in a corresponding mounting in the small table.

7. An arrangement according to claim 6, in which means are provided for controllably transmitting the weight of the large table to the centre of the small table said means include an axial screw jack in the large table associated with said bolt and a resilient device cooperating with the screw jack to help control transmitting said weight.

8. An arrangement according to claim 4, in which the large table is provided with radial arms whose weight is supported on the small table by the weight transmitting means.

9. An arrangement according to claim 8, wherein the large table has a polygonal bed; a system of rods; at least one of said radial arms is connected to one end of a rod in said system of rods; and said weight transmitting means comprises bolt means supported at one end in the center of the small table and axially movable at the other end, a stepped member associated with the movable end of said bolt means and having a plurality of surfaces facing said small table each individually adapted to engage the other end of said rod in said system of rods and press same against said bed, and resilient means interposed between the respective ends of said bolt means to control the loading on the small table.

10. An arrangement according to claim 5, in which the small table, whose surface is flush with ground level, is mounted on a bench in a pit along the edges of which are disposed support plates for the seat of the large table, and two roller tracks for wheels connected to this seat and retractable into the interior of the latter.

References Cited

UNITED STATES PATENTS

| 1,443,899 | 1/1923 | Kusold | 90—58 X |
| 1,511,141 | 10/1924 | Scott et al. | 51—240 |

FOREIGN PATENTS

| 185,004 | 8/1922 | Great Britain. |

GIL WEIDENFELD, Primary Examiner

U.S. Cl. X.R.

90—56; 51—240